United States Patent
Fenger

(10) Patent No.: US 12,434,946 B2
(45) Date of Patent: Oct. 7, 2025

(54) ROTOR BLADE HOISTING SYSTEM AND METHOD OF INSTALLATION AND/OR DEINSTALLATION OF A ROTOR BLADE

(71) Applicant: LIFTRA IP APS, Aalborg (DK)

(72) Inventor: Per Eske Fenger, Terndrup (DK)

(73) Assignee: LIFTRA IP APS, Aalborg (SE)

(*) Notice: Subject to any disclaimer, the term of this patent is extended or adjusted under 35 U.S.C. 154(b) by 816 days.

(21) Appl. No.: 17/270,703

(22) PCT Filed: Sep. 13, 2019

(86) PCT No.: PCT/EP2019/074494
§ 371 (c)(1),
(2) Date: Feb. 23, 2021

(87) PCT Pub. No.: WO2020/053389
PCT Pub. Date: Mar. 19, 2020

(65) Prior Publication Data
US 2022/0348441 A1    Nov. 3, 2022

(30) Foreign Application Priority Data
Sep. 13, 2018 (DK) .......................... PA 2018 70585

(51) Int. Cl.
*B66C 1/10* (2006.01)
*F03D 13/10* (2016.01)

(52) U.S. Cl.
CPC .............. *B66C 1/108* (2013.01); *F03D 13/10* (2016.05)

(58) Field of Classification Search
CPC ......... B66C 1/108; B66C 13/06; F03D 13/10; F03D 80/50
(Continued)

(56) References Cited

U.S. PATENT DOCUMENTS 1,928,213 A * 9/1933 Showers, Jr. ........... B66C 1/101
                                                 294/81.2
4,883,184 A * 11/1989 Albus .................... B66C 13/08
                                                 212/323
(Continued)

FOREIGN PATENT DOCUMENTS

DK    2014 00575 A1   4/2016
EP    2 345 811 A1    7/2011
(Continued)

OTHER PUBLICATIONS

Indian Examination Report for Indian Application No. 202117007742, dated Aug. 5, 2022, with English translation.

*Primary Examiner* — Sarang Afzali
*Assistant Examiner* — Darrell C Ford
(74) *Attorney, Agent, or Firm* — Birch, Stewart, Kolasch & Birch, LLP

(57) ABSTRACT

A hoisting system includes an upper cable support system to be mounted on a top end of a wind turbine, a lower cable support system at a lower end of the wind turbine, and left and right cables extended between the cable support systems. A clamping yoke arranged approximately at the centre of gravity of a rotor blade includes left and right climbing systems adapted to climb on the cables with first and second rollers spaced in a longitudinal direction of the blade whereby the first rollers are nearer a root end of the blade than the second rollers. A position at least in the longitudinal direction of the blade of the first roller of at least one of the left and the right climbing systems is adjustable by an actuator.

20 Claims, 13 Drawing Sheets

Figure 1:
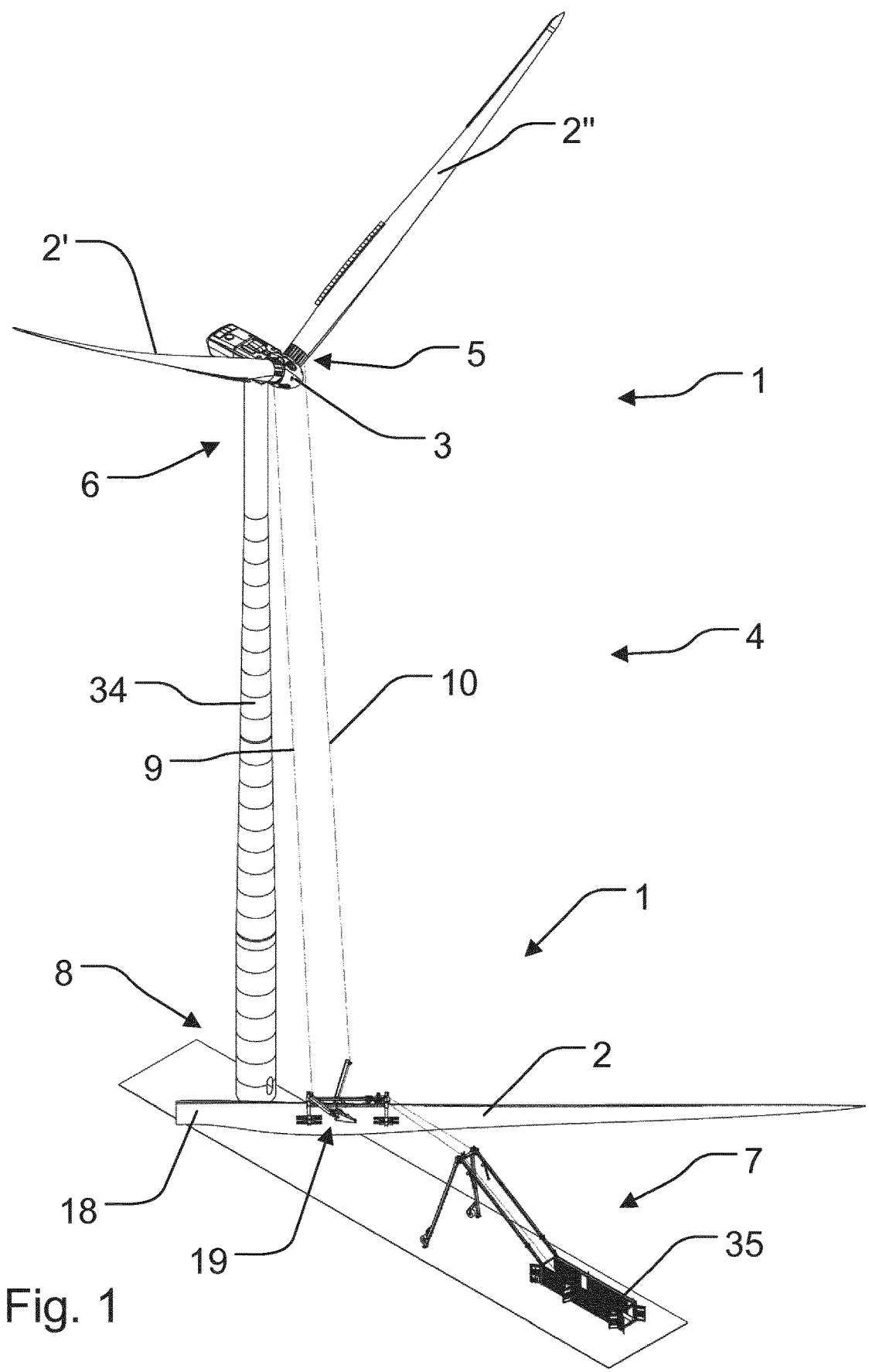

(58) Field of Classification Search
USPC .............................................. 294/81.3, 67.21
See application file for complete search history.

(56) References Cited

U.S. PATENT DOCUMENTS

| | | | | |
|---|---|---|---|---|
| 8,191,721 | B2* | 6/2012 | Hansen | B66C 23/36 |
| | | | | 212/167 |
| 9,638,163 | B2* | 5/2017 | Holloway | B66C 13/08 |
| 10,988,351 | B2* | 4/2021 | Aitken | B66C 23/68 |
| 2007/0056801 | A1* | 3/2007 | Iversen | F03D 80/50 |
| | | | | 182/141 |
| 2007/0290426 | A1 | 12/2007 | Trede et al. | |
| 2008/0169258 | A1* | 7/2008 | Weisbauer | B66C 23/344 |
| | | | | 212/347 |
| 2010/0139062 | A1* | 6/2010 | Reed | F03D 13/10 |
| | | | | 29/889.1 |
| 2010/0150665 | A1* | 6/2010 | Karal | B63B 77/10 |
| | | | | 405/231 |
| 2011/0140060 | A1 | 6/2011 | Olson et al. | |
| 2011/0185571 | A1 | 8/2011 | Maj et al. | |
| 2012/0032125 | A1* | 2/2012 | Diaz De Corcuera | B66C 1/108 |
| | | | | 254/131 |
| 2012/0257978 | A1* | 10/2012 | Jensen | F03D 1/0608 |
| | | | | 416/223 R |
| 2014/0010658 | A1* | 1/2014 | Nielsen | F03D 80/50 |
| | | | | 29/889.1 |
| 2014/0219812 | A1* | 8/2014 | Abolfazlian | F03D 13/20 |
| | | | | 29/888.025 |
| 2015/0233341 | A1* | 8/2015 | Neumann | B66C 1/66 |
| | | | | 414/800 |
| 2017/0045029 | A1* | 2/2017 | Senthoorpandian | F03D 80/50 |
| 2017/0218927 | A1* | 8/2017 | Holloway | F03D 80/50 |
| 2021/0270241 | A1* | 9/2021 | Svinth | F03D 13/10 |

FOREIGN PATENT DOCUMENTS

| | | |
|---|---|---|
| EP | 2 144 837 B1 | 6/2012 |
| EP | 2 640 985 B1 | 1/2016 |
| ES | 2 371 703 A1 | 1/2012 |
| KR | 10-2015-0045114 A | 4/2015 |
| WO | WO 2008/132226 A1 | 11/2008 |
| WO | WO 2012/095112 A1 | 7/2012 |
| WO | WO 2014/082641 A1 | 6/2014 |
| WO | WO 2018/054440 A1 | 3/2018 |

\* cited by examiner

ROTOR BLADE HOISTING SYSTEM AND METHOD OF INSTALLATION AND/OR DEINSTALLATION OF A ROTOR BLADE

The present invention relates to a rotor blade hoisting system for installation and/or deinstallation of a rotor blade on a hub of a wind turbine, the rotor blade hoisting system including an upper cable support system adapted to be mounted on a top end of the wind turbine, a lower cable support system adapted to be arranged at a lower end of the wind turbine at a distance from the wind turbine, at least a left and a right cable both adapted to be extended, in spaced relationship, between the upper cable support system and the lower cable support system, a clamping system adapted to be clamped onto a rotor blade of the wind turbine, the clamping system including a left climbing system adapted to climb on the left cable and a right climbing system adapted to climb on the right cable, each of the left and the right climbing systems including at least a first and a second roller adapted to roll on the respective cable and adapted to, when the clamping system is clamped onto the rotor blade, be spaced in a longitudinal direction of the rotor blade so that the first rollers are placed nearer a root end of the rotor blade than the second rollers, and wherein at least one of the first and second rollers of each of the left and the right climbing systems is a motor driven roller.

DK 2014 00575 A1 (Liftra) discloses a method of replacement of a rotor blade on a wind turbine, wherein wires are extended between a lower land based wire support system and an upper wire support system being mounted on the wind turbine rotor. A first clamp is mounted on the root end of the rotor blade and a second clamp is mounted on the tip end of the rotor blade. Each clamp runs on the wires by means of trolleys and at least one motor driven wire climbing hoist is associated with each wire and a respective clamp. By means of this system, a conventional land based crane higher than the wind turbine may be dispensed with. However, it may be difficult maneuvering the rotor blade next to the ground, and therefore a relatively small land based crane is employed for carrying the blade tip end as long as the rotor blade is close to the ground.

WO 2018/054440 A1 (Liftra) discloses a further development of the above-mentioned method of replacement of a rotor blade on a wind turbine, wherein the clamping system and hoisting system has been improved.

However, in these prior art systems employing separate clamps arranged at the tip end and at the root end, respectively, during hoisting of the blade, the blade transfers torque, depending on the load on the clamps. In some situations, the size of the torque transferred by the blade may be unacceptable. Furthermore, in order to handle the blade during hoisting, it is necessary to arrange the lower land based wire support system at a certain distance from the tower of the wind turbine. In some situations, this may present a problem due to limiting structures in the surroundings. Furthermore, the blade may be difficult maneuvering during hoisting, especially in windy conditions, whereby high wire tensions may be experienced as a result of uneven load distribution. As a result, the entire hoisting system may have to be designed to higher load requirements than that of a system having a more even load distribution.

US 2011/0185571 A1 discloses a method of installing wind turbine blades utilizing a clamp which is adapted to be removably connected to each of the blades and which in turn may be connected to a hook of a crane which may be installed near the tower of the wind turbine. In particular, the clamp may be adapted to rotate a clamped blade around a transverse axis of the blade and/or to rotate a clamped blade around a longitudinal axis of the clamped blade.

The object of the present invention is to provide a rotor blade hoisting system of the type mentioned by way of introduction, whereby the torque transferred by the blade during installation may be effectively reduced compared to prior art systems, and whereby maneuvering of the rotor blade may be facilitated.

In view of this object, the clamping system includes a clamping yoke adapted to be arranged approximately at the position of the centre of gravity of the rotor blade, at least in the longitudinal direction of the rotor blade, the left and the right climbing systems are mounted on the clamping yoke, and, when the clamping system is clamped onto the rotor blade, a position at least in the longitudinal direction of the rotor blade of the first roller of at least one of the left and the right climbing systems is adjustable by means of an actuator.

In this way, the rotor blade may be carried by means of a single clamping yoke incorporating both first and second rollers of the left and right climbing systems, and it may thereby be avoided that torque is transferred by the rotor blade from one yoke to another. At the same time, by adjusting the longitudinal position of a first roller of one of the climbing systems by means of an actuator, the maneuvering of the rotor blade during hoisting may be improved compared to prior art systems, even if the yoke construction is made very compact. In particular, by adjusting said longitudinal position of a first roller, the rotor blade may, when oriented horizontally, be rotated about a vertical axis, so that the blade may be positioned on the ground in an oblique angle to a line between the wind turbine tower and the lower cable support system, thereby requiring less space on the ground. Because such rotation of the wind turbine blade during hoisting may be obtained without pulling the cables, strength requirements of the system may be reduced.

Although by adjusting said longitudinal position of only a single one of the first rollers, the rotor blade may be rotated about a vertical axis, more flexibility may be obtained by adjusting said longitudinal position of both a left and a right first roller and this may therefore be preferred.

In an embodiment, when the clamping system is clamped onto the rotor blade, a position of the first roller of each of the left and the right climbing systems is individually adjustable by means of an actuator at least in a specific direction extending transversely to the longitudinal direction of the rotor blade. Said specific direction preferably extends at least substantially in the direction of a chord of the rotor blade. Thereby, during hoisting of the rotor blade, by adjusting said position of the first rollers, it may be possible to tilt the rotor blade about a horizontal axis extending at right angles to said specific direction extending transversely to the longitudinal direction of the rotor blade. This may be obtained as a result of the position of the first rollers being displaced in relation to the centre of gravity of the rotor blade. Thus, in this way, the orientation of the rotor blade may, during hoisting, be adapted to the required orientation for mounting on the hub of the wind turbine, i.e. an orientation wherein the longitudinal direction of the rotor blade extends at least substantially in vertical direction. As this orientation of the rotor blade may be performed by means of said actuator or actuators, it may not be necessary pulling the left and/or right cable forcefully during hoisting. As a result, maneuvering of the rotor blade may indeed be facilitated, and furthermore, strength requirements of the entire hoisting system may be reduced. In particular, the upper cable support system adapted to be mounted on a top end of the wind turbine and the left and right cables may be designed to carry reduced loads as compared to prior art systems.

In an embodiment, when the clamping system is clamped onto the rotor blade, a direct distance between the first rollers of the left and the right climbing systems, respectively, is freely variable within certain limits. Thereby, the distance between the first rollers may more or less adapt automatically to a distance between the left and right cables being suspended from the upper cable support system.

In an embodiment, when the clamping system is clamped onto the rotor blade, a direct distance between the first rollers of the left and the right climbing systems, respectively, is individually adjustable by means of at least one actuator. Thereby, the distance between the first rollers may be controlled independently of a distance between the left and right cables being suspended from the upper cable support system. As a result, even more precise control of the hoisting process may be obtained.

In a structurally particularly advantageous embodiment, the first roller of at least one of the left and the right climbing systems is arranged on a swing arm being arranged on the clamping system, and a swing arm actuator is arranged to swing said swing arm in relation to the clamping system. Thereby, in a simple way, by swinging said swing arm, the position of the first roller may be adjusted both in the longitudinal direction of the rotor blade and in said specific direction extending transversely to the longitudinal direction of the rotor blade.

In a structurally particularly advantageous embodiment, the swing arm is arranged pivotally on the clamping system generally about a main pivot axis extending transversely in relation to the rotor blade, when the clamping system is clamped onto the rotor blade, and the swing arm actuator is arranged to pivot said swing arm generally about said main pivot axis.

In an embodiment, said swing arm is composed by a first section and a second section being pivotally linked. Thereby, a further possibility of adjustment of the position of the first roller may be obtained.

In an embodiment, said swing arm is composed by a first section and a second section being pivotally linked together about an auxiliary pivot axis extending transversely to the main pivot axis. Thereby, the distance between the first rollers may more or less adapt to a distance between the left and right cables being suspended from the upper cable support system.

In an embodiment, an auxiliary swing arm actuator is arranged to pivot the first section and the second section in relation to each other. Thereby, the distance between the first rollers may be controlled independently of a distance between the left and right cables being suspended from the upper cable support system. As a result, even more precise control of the hoisting process may be obtained.

The present invention further relates to a method of installation and/or deinstallation of a rotor blade on a hub of a wind turbine, the method including the following steps: mounting an upper cable support system on a top end of the wind turbine, arranging a lower cable support system at a lower end of the wind turbine at a distance from the wind turbine, extending, in spaced relationship, at least a left and a right cable between the upper cable support system and the lower cable support system, clamping a clamping system onto a rotor blade, arranging a left climbing system of the clamping system on the left cable and a right climbing system of the clamping system on the right cable, each of the left and the right climbing systems including at least a first and a second roller rolling on the respective cable and being spaced in a longitudinal direction of the rotor blade, the first rollers being placed nearer a root end of the rotor blade than the second rollers, driving at least one of the first and second rollers of each of the left and the right climbing systems by means of a motor, thereby hoisting the rotor blade upward or downward.

The method is characterised by arranging a clamping yoke of the clamping system approximately at the position of the centre of gravity of the rotor blade, at least in the longitudinal direction of the rotor blade, the left and the right climbing systems being mounted on the clamping yoke, and by, when the rotor blade is at a first intermediate hoisting position between the lower end of the wind turbine and the top end of the wind turbine, adjusting a position at least in the longitudinal direction of the rotor blade of the first roller of at least one of the left and the right climbing systems by means of an actuator in such a way that the rotor blade yaws about a vertical axis extending in a transverse direction of the rotor blade and/or tilts about a horizontal axis extending in a transverse direction of the rotor blade. Thereby, the above-mentioned features may be obtained.

In an embodiment, when the rotor blade is at a second intermediate hoisting position being above the first intermediate hoisting position, a position at least in a specific direction extending transversely to the longitudinal direction of the rotor blade of the first roller of each of the left and the right climbing systems is individually adjusted by means of an actuator in such a way that the rotor blade tilts about a horizontal axis extending in a transverse direction of the rotor blade. Thereby, the above-mentioned features may be obtained.

In an embodiment, a relative position between the first roller of at least one of the left and the right climbing systems and the clamping yoke is adjusted by adapting the position of a swing arm arranged on the clamping yoke and carrying said first roller. Thereby, the above-mentioned features may be obtained.

Figure 2:
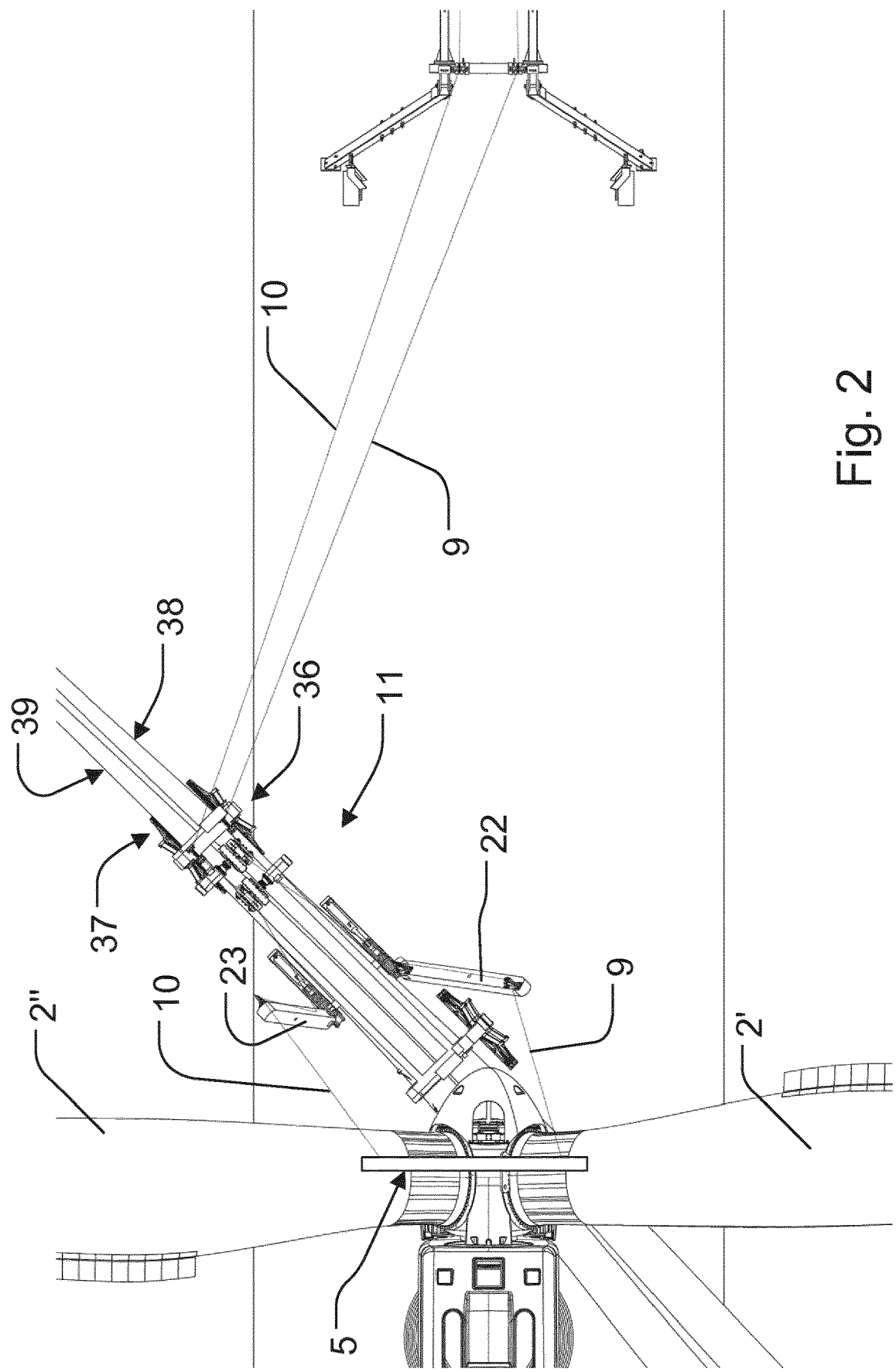
Figure 3:
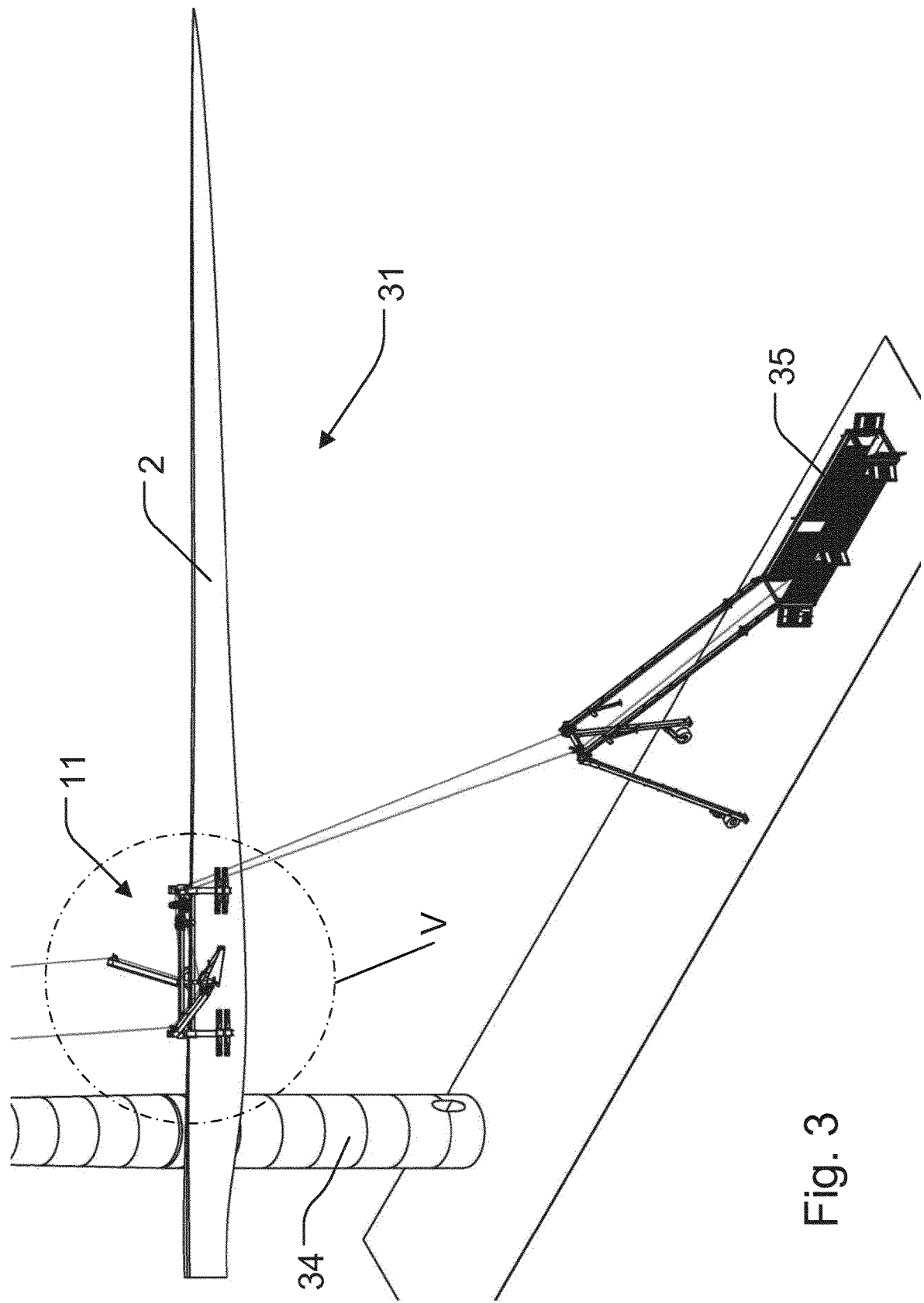
Figure 4:
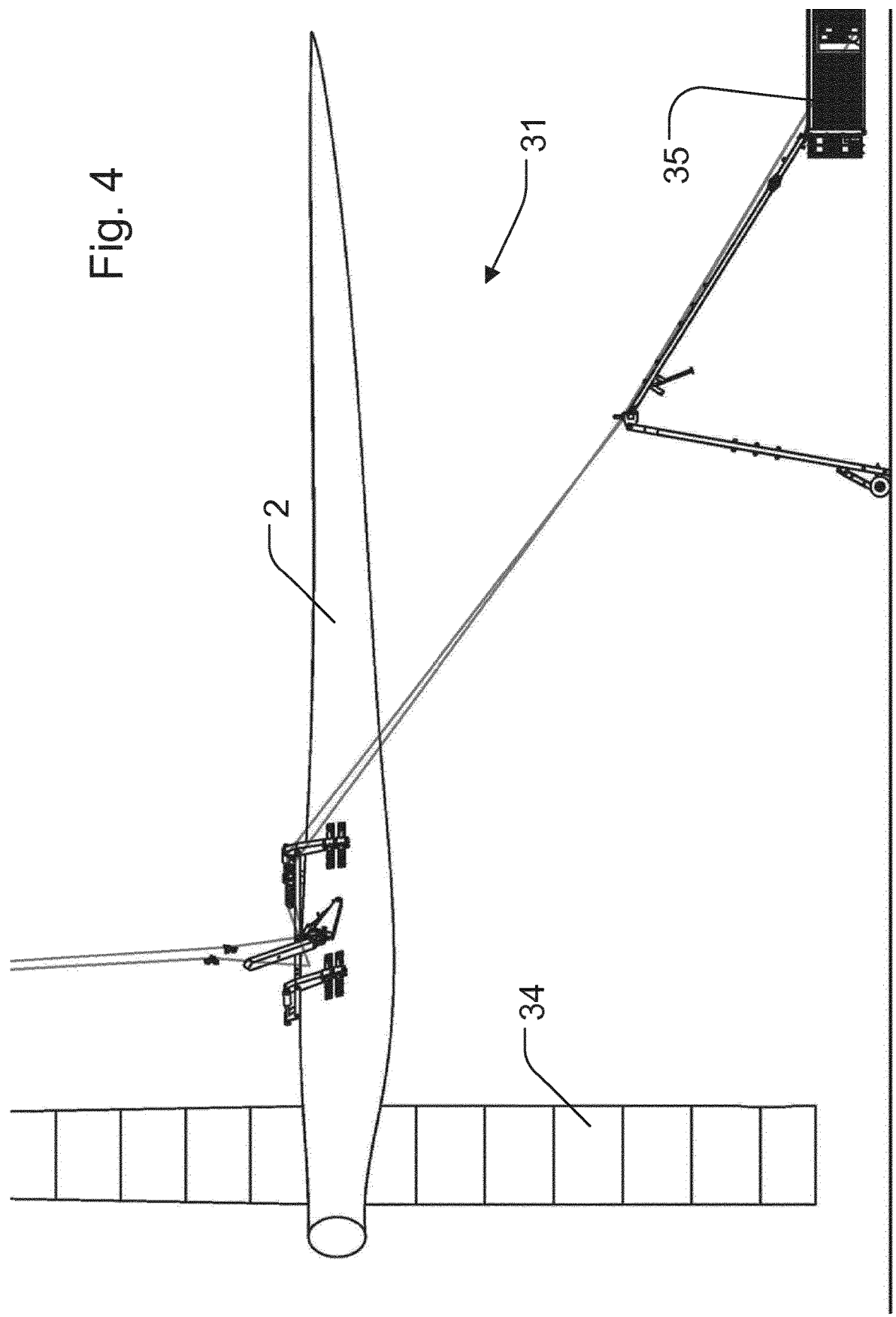
Figure 5:
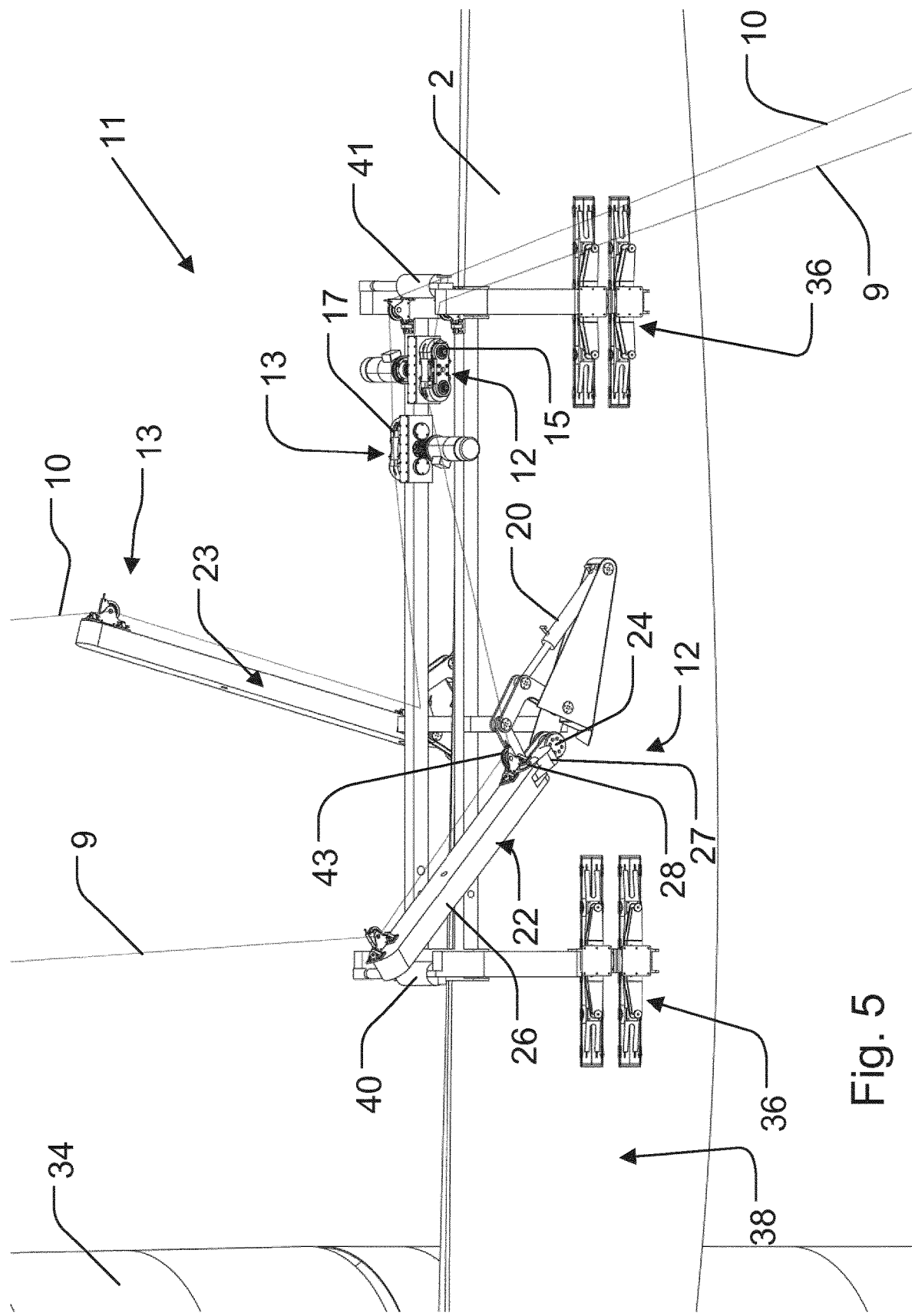
Figure 6:
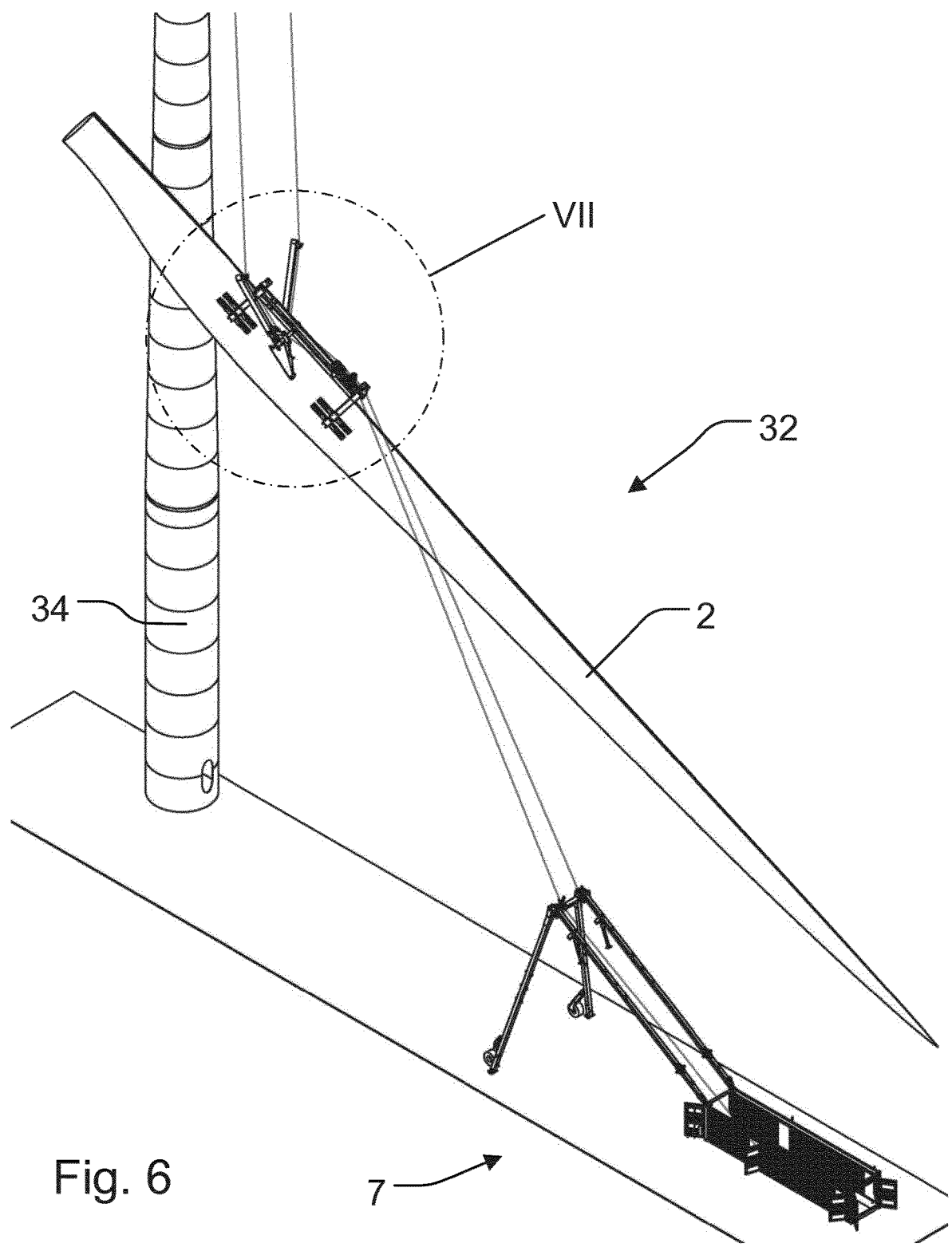
Figure 7:
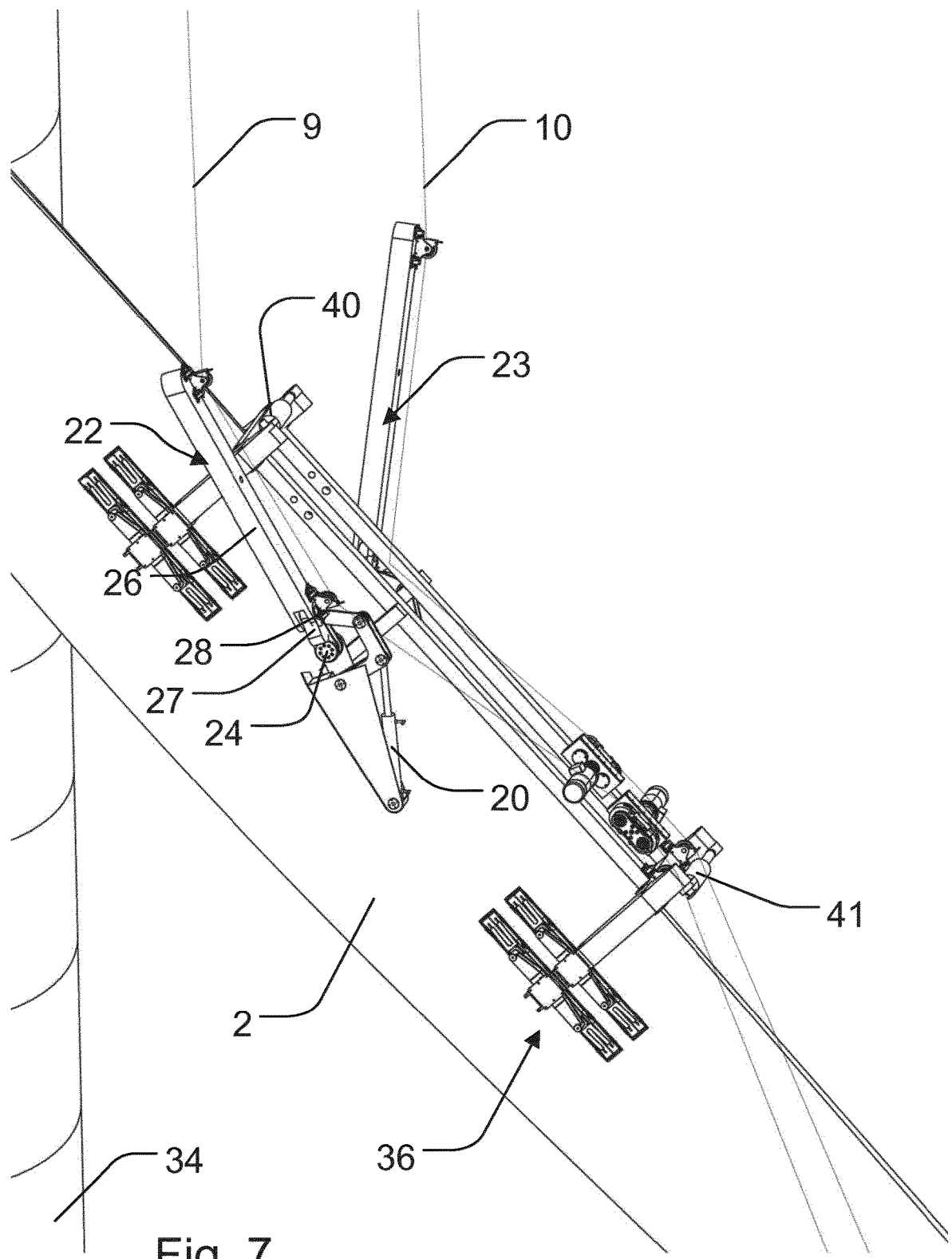
Figure 8:
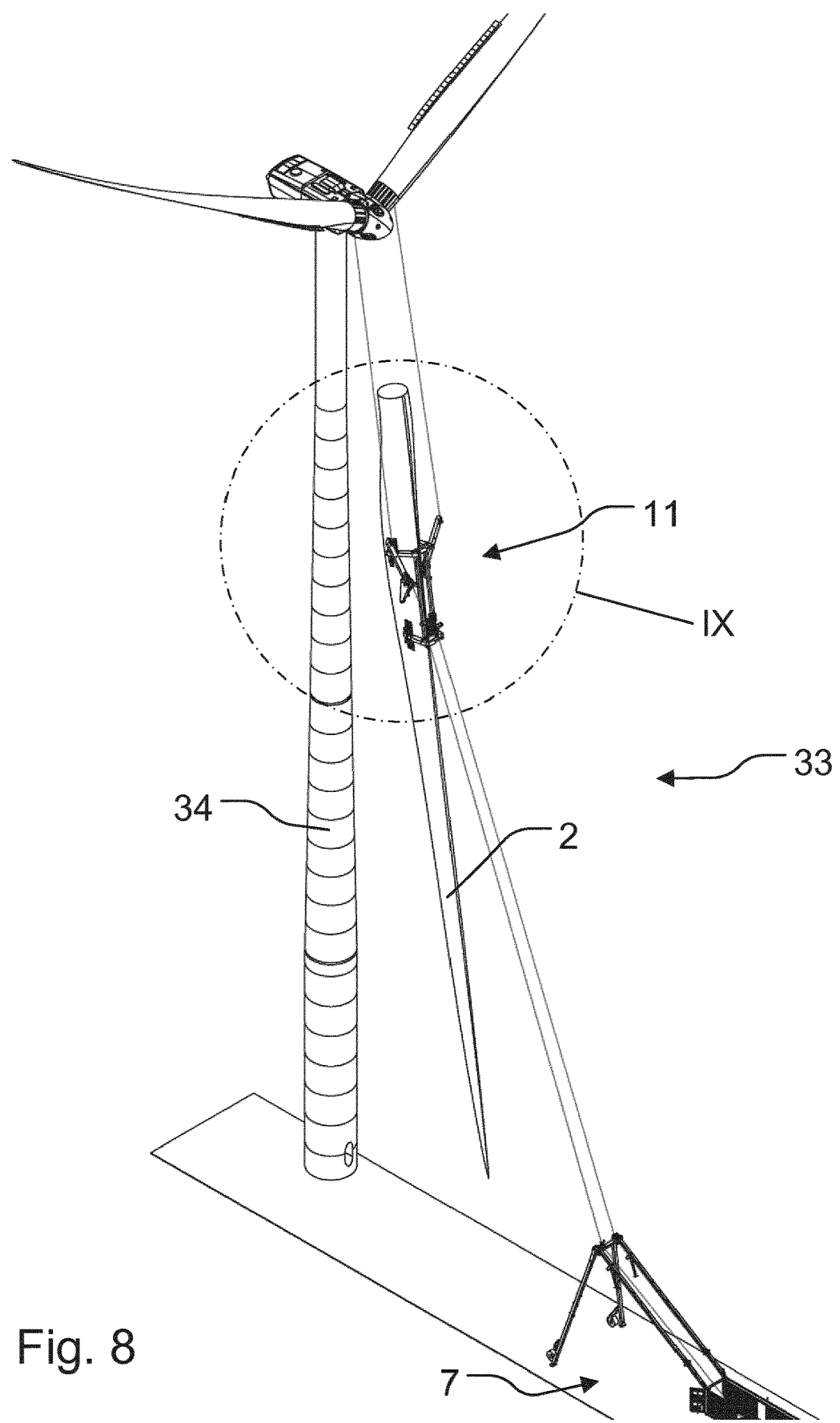
Figure 9:
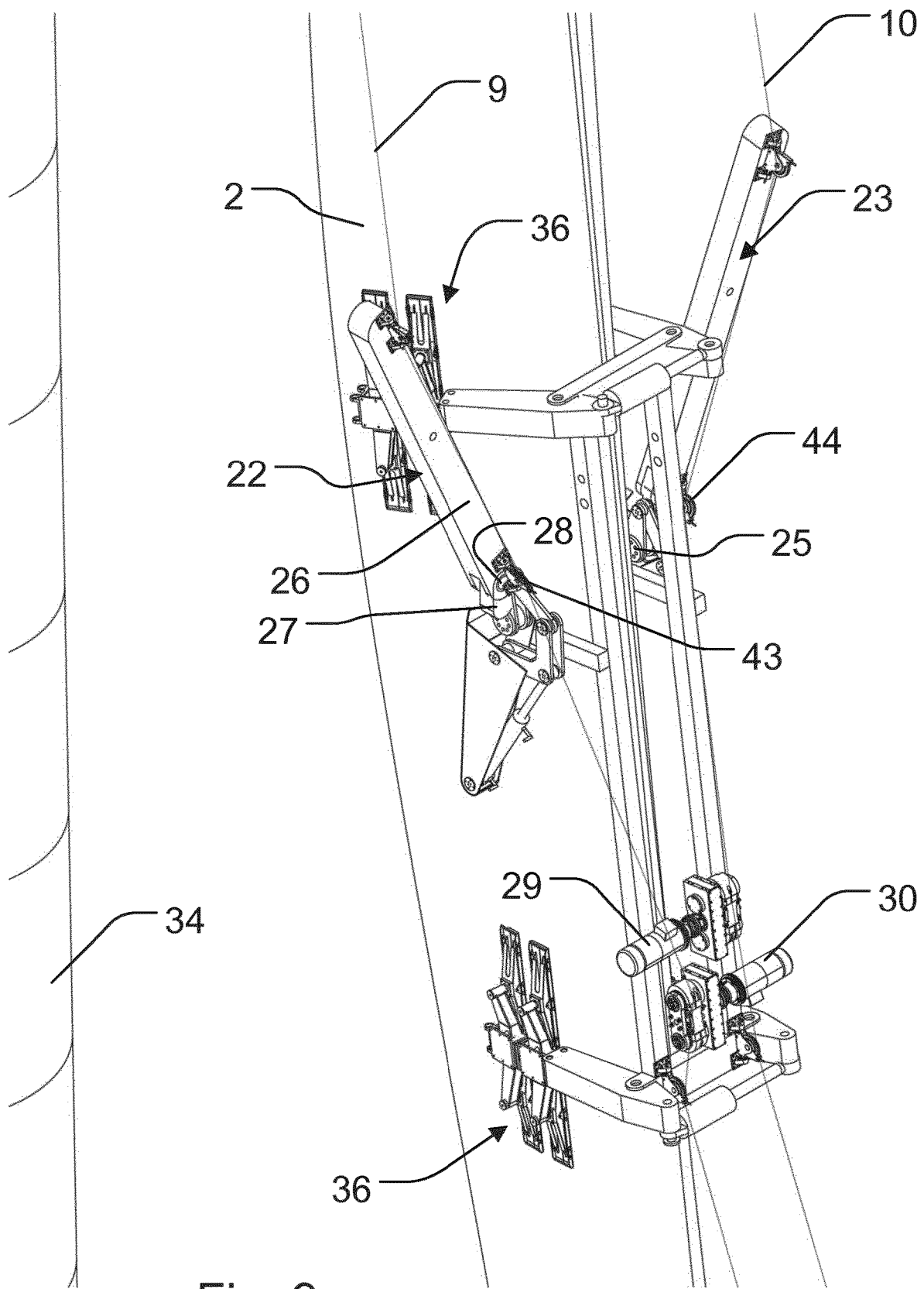
Figure 10:
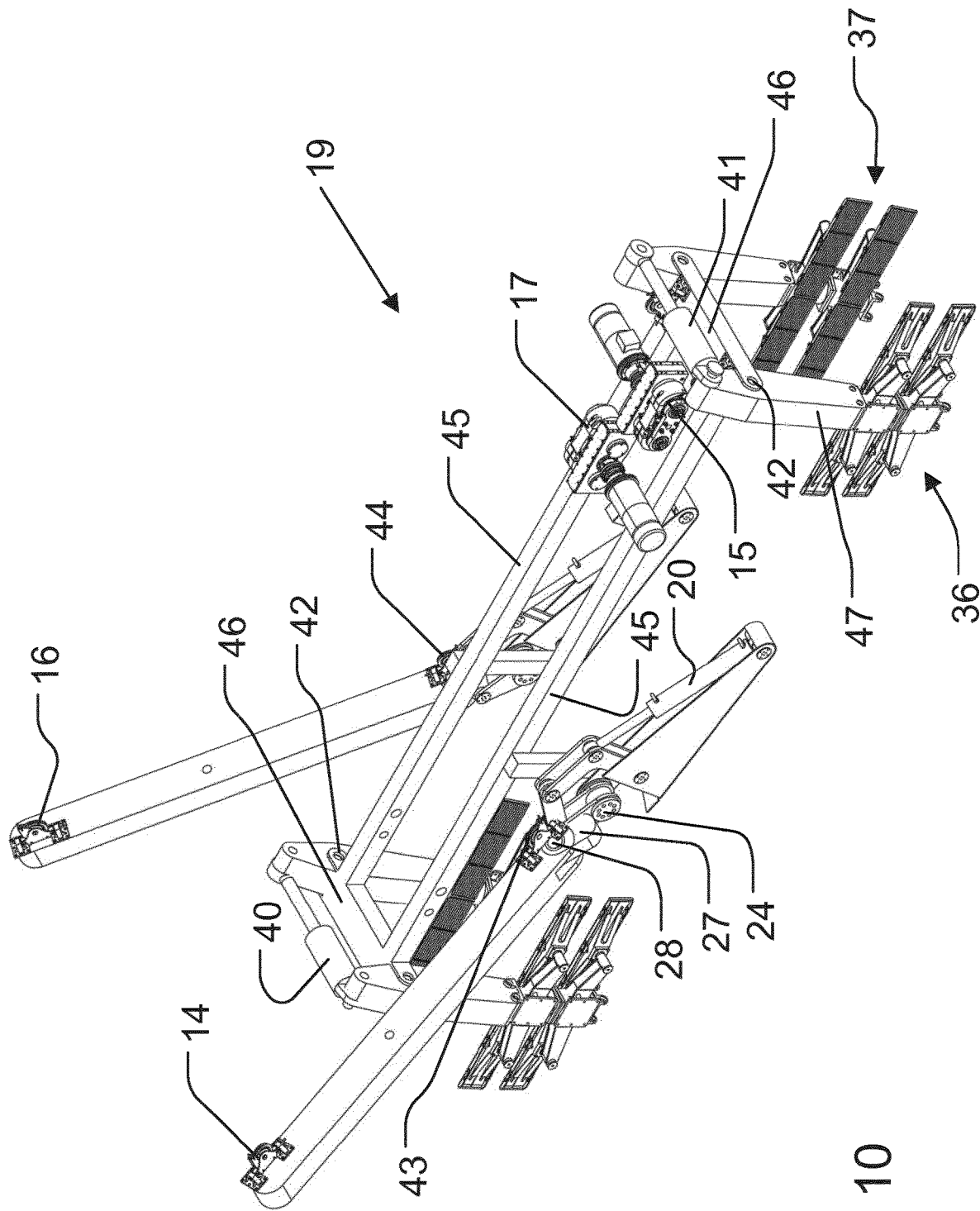
Figure 11:
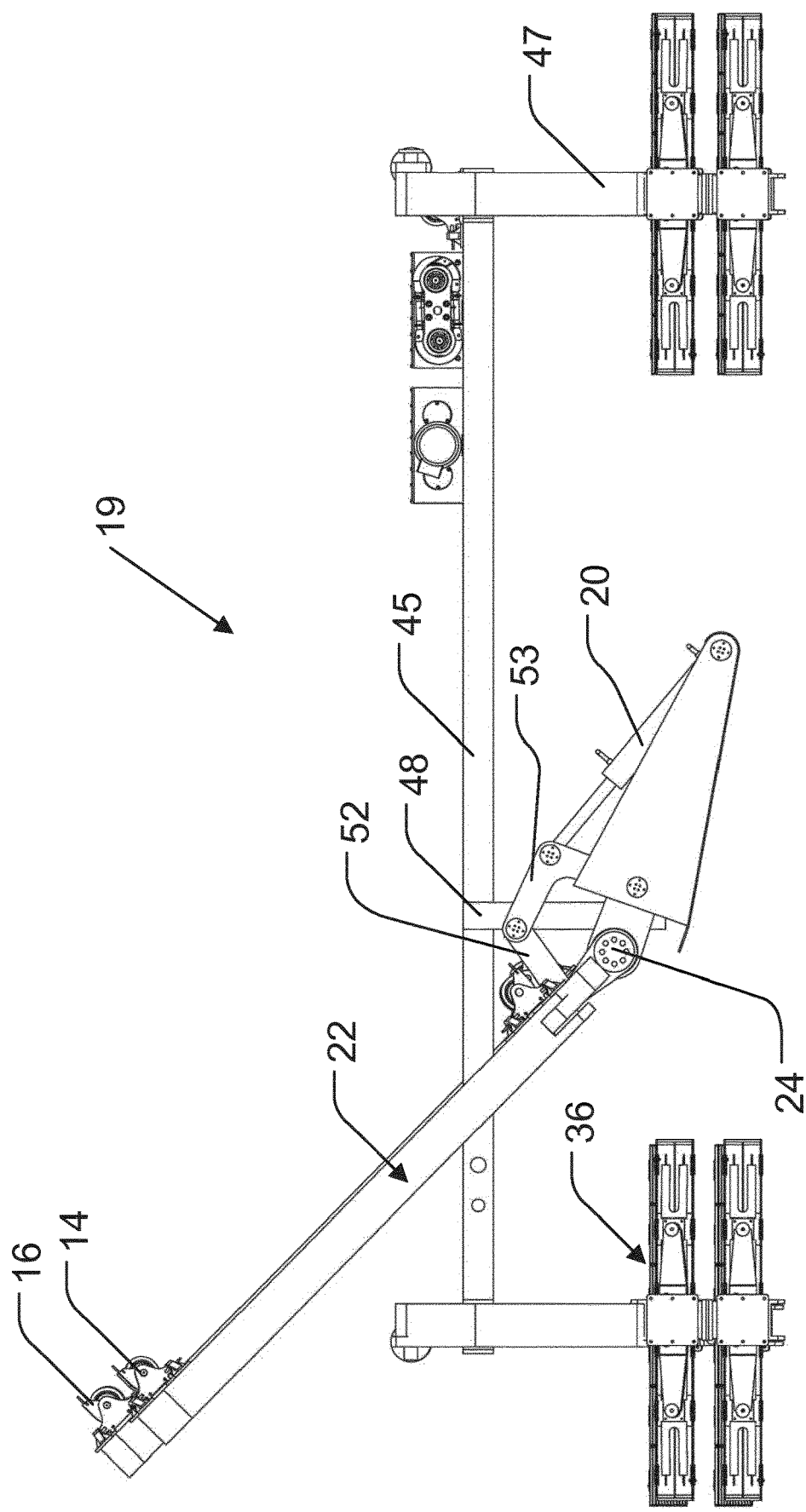
Figure 12:
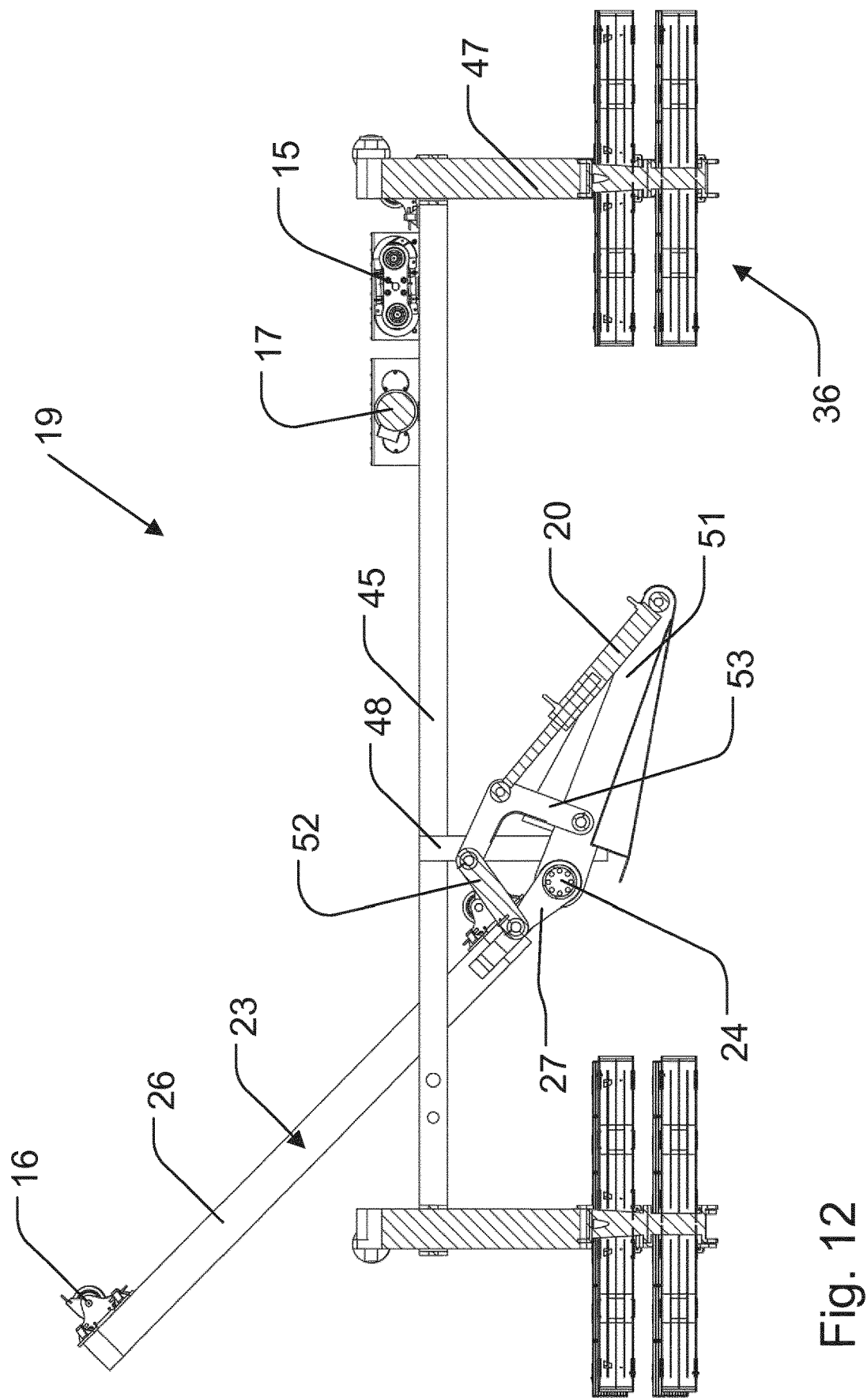
Figure 13:
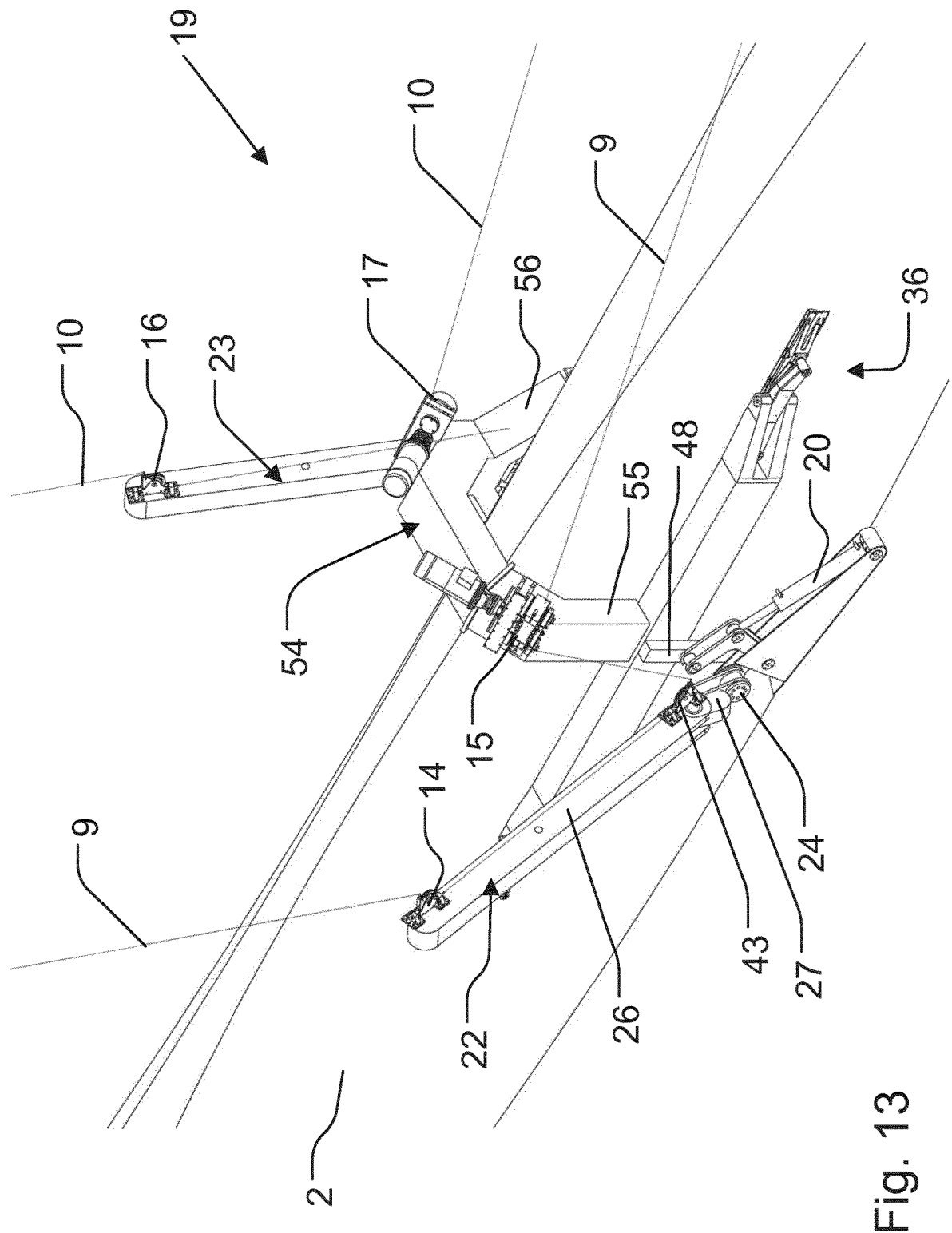

The invention will now be explained in more detail below by means of examples of embodiments with reference to the very schematic drawing, in which FIG. 1 is a perspective view of a land based wind turbine and a rotor blade hoisting system according to the invention, during installation of a rotor blade, whereby the rotor blade is at a position near the ground level, FIG. 2 is a partial view, seen from above, of the land based wind turbine and rotor blade hoisting system of FIG. 1, FIG. 3 is a partial perspective view of the land based wind turbine and rotor blade hoisting system of FIG. 1, during installation of a rotor blade, whereby the rotor blade has been lifted further upward, but is still extending horizontally, FIG. 4 is view corresponding to that of FIG. 3, but seen from the side, FIG. 5 is a partial view of the detail V of FIG. 3, seen on a larger scale, FIG. 6 is a partial perspective view of the land based wind turbine and rotor blade hoisting system of FIG. 1, during installation of a rotor blade, whereby the rotor blade has been lifted even further upward and is now hanging at an oblique angle with respect to the horizontal, FIG. 7 is a partial view of the detail VII of FIG. 6, seen on a larger scale, FIG. 8 is a partial perspective view of the land based wind turbine and rotor blade hoisting system of FIG. 1, during installation of a rotor blade, whereby the rotor blade has been lifted to a position with its root end hanging near the hub of the wind turbine, and whereby the rotor blade extends nearly vertically, FIG. 9 is a partial view of the detail IX of FIG. 8, seen on a larger scale, FIG. 10 is a perspective view of a clamping yoke of a rotor blade hoisting system according to the invention, FIG. 11 is a side view of the clamping yoke of FIG. 10, FIG. 12 is a vertical section through the clamping yoke of FIG. 10 in a plane extending just through a foremost hydraulic actuator, and FIG. 13 is a perspective view of another embodiment of a clamping yoke of a rotor blade hoisting system according to the invention.

FIG. 1 shows a rotor blade hoisting system 1 according to the present invention for installation and/or deinstallation of a rotor blade 2 on a hub 3 of a horizontal axis wind turbine 4 well known in the art. The rotor blade hoisting system 1 includes an upper cable support system 5 mounted on a top end 6 of the wind turbine 4 and a lower cable support system 7 arranged at a lower end 8 of the wind turbine 4 at a distance from the wind turbine. The upper cable support system 5 is indicated only in FIG. 2 and includes a spacer element well known in the art which is positioned between two fixed rotor blades 2', 2". The spacer element includes a centre section and two guide sections arranged at either fixed rotor blades 2', 2". The spacer element may be arranged on the fixed rotor blades 2', 2" for instance by means of slings around the root end of the rotor blades 2', 2" and may further be secured to a nacelle of the wind turbine for instance by means of separate cables. The two guide sections are designed to interact with a left cable 9 and a right cable 10, respectively. By means of the spacer element with the guide sections the cables 9, 10 are prevented from sliding down the slope of the rotor blades 2', 2" that they are mounted on. The lower cable support system 7 may the form of winch system arranged in a land based container 35 well known in the art. The left and right cables 9, 10 are typically metal wires, but any suitable cables may be used.

The left and a right cables 9, 10 are extended, in spaced relationship, between the upper cable support system 5 arranged between two fixed rotor blades 2', 2" and the lower cable support system 7 based on the ground. A rotor blade 2 intended to be mounted on the hub 3 of the wind turbine 4 has been provided with a clamping system 11 when the rotor blade 2 was situated on the ground or very near the ground. The clamping system 11 includes a left climbing system 12 arranged to climb on the left cable 9 and a right climbing system 13 arranged to climb on the right cable 10.

Each of the left and the right climbing systems 12, 13 includes a first roller 14, 16 and a second roller 15, 17 arranged to roll on the respective cable 9, 10 and being spaced in a longitudinal direction of the rotor blade 2 so that the first rollers 14, 16 are placed nearer a root end 18 of the rotor blade 2 than the second rollers 15, 17. As seen in the figures, in addition to the left and right first and second rollers 14, 15, 16, 17, the left and the right climbing systems 12, 13 includes further auxiliary rollers 43, 44.

As seen particularly well in FIG. 5, the second roller 15, 17 of each of the left and the right climbing systems 12, 13 is a remotely controlled motor driven roller adapted to climb on the respective cable 9, 10. The motor may be an electric motor or a hydraulic motor. A climbing hoist of this type is well known in the art and may typically function so that the cable is winded several times around the roller 15, 17, thereby providing friction between the cable and the roller. However, alternatively, an end of a lower cable running to the lower cable support system 7 may be fixed on a second motor driven roller 15, 17 so that the cable is rolled up on the second roller. In addition, an end of an upper cable running to the upper cable support system may be fixed on another motor driven roller, for instance a first roller 14, 16, so that the corresponding cable is rolled up on that roller. In this alternative embodiment, the lower cable and the upper cable may together form the left cable 9 or the right cable 10.

As seen for instance in FIG. 5, the clamping system 11 includes a clamping yoke 19 which has been arranged approximately at the centre of gravity of the rotor blade 2. The clamping yoke 19 includes two left clamping devices 36 abutting a first side 38 of the rotor blade 2 and two right clamping devices 37 abutting a second side 39 of the rotor blade. In the illustrated embodiment, the first and second sides 38, 39 of the rotor blade 2 represent the pressure side and the suction side, respectively. In the embodiment of FIG. 5, the left clamping devices 36 and the right clamping devices 37 are arranged pivotally 42 in relation to each other and so that they may be pressed against the first and second sides 38, 39, respectively, of the rotor blade 2 by means of hydraulic actuators 40, 41. As further seen, the left and the right climbing systems 12, 13 are mounted on the clamping yoke 19.

Referring to FIG. 3, when the rotor blade 2 is at a first intermediate hoisting position 31 between the lower end 8 of the wind turbine 4 and the top end 6 of the wind turbine 4, the rotor blade 2 may be brought to yaw about a vertical axis extending in a transverse direction of the rotor blade 2, and preferably more or less at the centre of gravity of the rotor blade 2, by adjusting a position along the longitudinal direction of the rotor blade 2 of the first rollers 14, 16 of each of the left and the right climbing systems 12, 13 by means of respective hydraulic actuators 20, 21. According to the present invention, however, it may be sufficient to adjust a position along the longitudinal direction of the rotor blade 2 of only a single one of the first rollers 14, 16 of the left and the right climbing systems 12, 13.

Because according to the present invention, the rotor blade 2 may be rotated about a vertical axis as explained above, the rotor blade 2 intended to be mounted on the hub 3 of the wind turbine 4 may initially be positioned on the ground extending in an oblique angle to a line between the wind turbine tower 34 and the lower cable support system 7, thereby requiring less space on the ground. Furthermore, because such rotation of the wind turbine blade 2 during hoisting may be obtained without pulling the left and right cables 9, 10, strength requirements of the entire rotor blade hoisting system 1 may be reduced.

Referring to FIGS. 6 and 7, when the rotor blade 2 is at a second intermediate hoisting 32 position being above the first intermediate hoisting position 31, the rotor blade 2 may be brought to tilt about a horizontal axis extending in a transverse direction of the rotor blade 2, and preferably more or less at the centre of gravity of the rotor blade 2, by individually adjusting a position in a specific direction extending transversely to the longitudinal direction of the rotor blade 2 of the first roller 14, 16 of each of the left and the right climbing systems 12, 13 by means of the respective hydraulic actuators 20, 21.

This tilting operation is obtained as a result of the position of the first rollers 14, 16 being displaced in relation to the centre of gravity of the rotor blade 2. Thus, in this way, the orientation of the rotor blade 2 may, during hoisting, be adapted to the required orientation for mounting on the hub 3 of the wind turbine 4, i.e. an orientation wherein the longitudinal direction of the rotor blade 2 extends at least substantially in vertical direction. This orientation is illustrated as the third intermediate hoisting position 33 of rotor blade 2 in FIGS. 8 and 9.

As this adaptation of the orientation of the rotor blade 2 may be performed by means of said hydraulic actuators 20, 21, it may not be necessary pulling the left and right cables 9, 10 forcefully during hoisting. As a result, maneuvering of the rotor blade 2 may indeed be facilitated, and furthermore, strength requirements of the entire rotor blade hoisting system 1 may be reduced. In particular, the upper cable support system 5 adapted to be mounted on a top end 6 of the wind turbine 4 and the left and right cables 9, 10 may be designed to carry reduced loads as compared to prior art systems.

According to the embodiments of the present invention illustrated in the figures, the first rollers 14, 16 of the left and the right climbing systems 12, 13 is arranged on a left and right swing arm 22, 23 arranged on the clamping system 11, i.e. the clamping yoke 19, and the hydraulic actuators 20, 21 have the form of swing arm actuators 20, 21 arranged to swing said swing arms 22, 23 in relation to the clamping system 11. As further seen, the swing arms 22, 23 are arranged pivotally on the clamping system 11 about main pivot axes 24, 25 extending transversely in relation to the rotor blade 2, when the clamping system 11 is clamped onto the rotor blade 2, and the swing arm actuators 20, 21 are arranged to pivot said swing arms 22, 23 about said main pivot axes 24, 25.

According to the embodiments of the present invention illustrated in the figures, a direct distance measured between the first rollers 14, 16 of the left and the right climbing systems 12, 13, respectively, is freely variable within certain limits, i.e. between a minimum distance and a maximum distance. Thereby, the distance between the first rollers 14, 16 may somewhat adapt automatically to a distance between the left and right cables 9, 10 being suspended from the upper cable support system 5. In the illustrated embodiments, this is achieved in that said respective swing arms 22, 23 are composed by a first section 26 and a second section 27 being pivotally linked together about an auxiliary pivot axis 28 extending transversely to the main pivot axis 24, 25.

According to an embodiment of the invention, in order to yaw the rotor blade 2 about a vertical axis extending in a transverse direction of the rotor blade 2, as described above, the position along the longitudinal direction of the rotor blade 2 of the first rollers 14, 16 of each of the left and the right climbing systems 12, 13 is able to be adjusted so that the distance in the longitudinal direction of the rotor blade 2 between said first rollers 14, 16 is at least the above-mentioned minimum distance measured between the first rollers 14, 16, preferably at least 1.5 times said minimum distance and more preferred at least about the double of said minimum distance.

However, according to an embodiment of the invention, a direct distance measured between the first rollers 14, 16 of the left and the right climbing systems 12, 13, respectively, may be individually adjustable by means of at least one actuator. This may be achieved in that a not shown auxiliary swing arm actuator may be arranged to pivot the first section 26 and the second section 27 in relation to each other.

FIGS. 10, 11 and 12 illustrate the embodiment of the clamping yoke 19 seen in FIGS. 1 to 9 in more detail. The clamping yoke 19 has a fixed frame composed by two longitudinal rods 45 maintained in spaced relation by means of a spacer rod 46 at either end thereof. At each spacer rod 46, two opposed clamping arms 47 are arranged pivotally on the fixed frame about the pivot joint 42 having its pivot axis extending in parallel to the two longitudinal rods 45. Each clamping arm 47 carries a respective left or right clamping device 36, 37. Each longitudinal rod 45 carries a swing arm mounting rod 48 fixed thereto and extending at right angles to the longitudinal rod 45 and being arranged slightly nearer to a first end 49 than to a second end 50 of the fixed frame. The swing arm mounting rod 48 protrudes downward from the longitudinal rods 45 in the figures just as the clamping arms 47. A swing arm base rod 51 is fixed to the swing arm mounting rod 48 at a slightly oblique angle pointing upwards in the direction of the first end 49 of the fixed frame. On a front end of the swing arm base rod 51, a first end of the respective left or right swing arm 22, 23, made up by the second section 27 of the swing arm, is mounted pivotally about the main pivot axis 24, 25 of the left or right swing arm. The main pivot axes 24, 25 extend at right angles to the longitudinal rods 45 of the fixed frame of the clamping yoke 19 and in parallel to the spacer rods 46 of the fixed frame. Therefore, when the clamping yoke 19 is mounted on a rotor blade 2, the main pivot axes 24, 25 extend at right angles to the longitudinal direction of the rotor blade. However, according to the present invention, the main pivot axes 24, 25 just extend transversely to the longitudinal direction of the rotor blade 2, but preferably at least substantially at right angles to the longitudinal direction of the rotor blade.

As seen in FIG. 10, the respective swing arms 22, 23 are composed by the first section 26 and the second section 27 which are pivotally linked together about the auxiliary pivot axis 28 extending at right angles to the main pivot axis 24, 25. The first section 26 and the second section 27 are freely pivotal within certain limits about the auxiliary pivot axis 28.

The second section 27 of the left or right swing arm 22, 23 and therefore also the left or right swing arm 22, 23 are arranged to swing about the main pivot axis 24, 25 of the left or right swing arm by means activation of the left and right swing arm actuators 20, 21, respectively. Referring to FIGS. 11 and 12, it is seen that the second section 27 of the left swing arm 22 is connected to the swing arm base rod 51 by means of a link mechanism composed by a first link rod 52 having its first end pivotally connected to the second section 27 and its second end pivotally connected to a first leg of an L-link 53, the other leg of which is pivotally connected to the swing arm base rod 51. The left swing arm actuator 20 which is a hydraulic actuator has its actuator rod connected pivotally to the middle of the L-link 53 and its actuator cylinder connected pivotally to the swing arm base rod 51.

FIG. 13 illustrates another embodiment of the clamping yoke 19 seen in FIGS. 1 to 9. In this embodiment, the fixed frame of the clamping yoke 19 is formed by a single C-bracket 54 having a first leg 55 on which the left clamping device 36 is fixed and a second leg 56 on which the right clamping device 37 is arranged pivotally about a pivot joint 42 which is not visible in the figure and which has a pivot axis extending in the longitudinal direction of the rotor blade 2 on which the clamping yoke 19 is mounted.

Each of the first and second legs 55, 56 of the C-bracket 54 carries a swing arm mounting rod 48 fixed thereto and extending in continuation thereof in the longitudinal direction of the respective leg 55, 56. The swing arm mounting rod 48 protrudes downward from the respective left or right clamping device 36, 37 and carries the respective left or right swing arm 22, 23 in the same way as explained above referring to the embodiment in FIGS. 10 to 12. As it is further seen, the left and right second rollers 15, 17 are mounted directly on a central part of the C-bracket 54.

LIST OF REFERENCE NUMBERS 1 rotor blade hoisting system
2, 2', 2" rotor blade
3 hub of wind turbine
4 wind turbine
5 upper cable support system
6 top end of wind turbine
7 lower cable support system
8 lower end of wind turbine
9 left cable
10 right cable
11 clamping system
12 left climbing system
13 right climbing system
14 left first roller
15 left second roller
16 right first roller
17 right second roller
18 root end of rotor blade
19 clamping yoke
20 left swing arm actuator
21 right swing arm actuator
22 left swing arm
23 right swing arm
24 main pivot axis of left swing arm
25 main pivot axis of right swing arm
26 first section of swing arm
27 second section of swing arm
28 auxiliary pivot axis of swing arm
29 motor of left climbing system
30 motor of right climbing system
31 first intermediate hoisting position of rotor blade
32 second intermediate hoisting position of rotor blade
33 third intermediate hoisting position of rotor blade
34 tower of wind turbine
35 land based container
36 left clamping device
37 right clamping device
38 first side of rotor blade
39 second side of rotor blade
40, 41 hydraulic actuator
42 pivot joint between left and right clamping devices
43 left auxiliary roller
44 right auxiliary roller
45 longitudinal rod of fixed frame of clamping yoke
46 spacer rod of fixed frame of clamping yoke
47 clamping arm
48 swing arm mounting rod
49 first end of fixed frame
50 second end of fixed frame
51 swing arm base rod
52 first link rod
53 L-link
54 C-bracket of frame of clamping yoke
55 first leg of C-bracket
56 second leg of C-bracket

The invention claimed is:

1. A rotor blade hoisting system for installation and/or deinstallation of a rotor blade on a hub of a wind turbine,
the rotor blade hoisting system including an upper cable support system configured to be mounted on a top end of the wind turbine,
a lower cable support system configured to be arranged at a lower end of the wind turbine at a distance from the wind turbine,
at least a left cable and a right cable both configured to be extended, in spaced relationship, from the lower cable support system to the upper cable support system,
a clamping system configured to be clamped onto a rotor blade of the wind turbine,
the clamping system including a left climbing system configured to climb on the left cable and a right climbing system configured to climb on the right cable, and
each of the left climbing system and the right climbing systems system including at least a first roller and a second roller configured to roll on the left cable and the right cable, respectively, and configured to, when the clamping system is clamped onto the rotor blade, be spaced in a longitudinal direction of the rotor blade so that the first rollers of the left climbing system and the right climbing system are placed nearer a root end of the rotor blade than the second rollers of the left climbing system and the right climbing system, respectively, wherein
at least one of the first roller and the second roller of each of the left climbing system and the right climbing system is a motor driven roller,
the clamping system includes a clamping yoke configured to be arranged at the position of the centre of gravity of the rotor blade, at least in the longitudinal direction of the rotor blade, and
the left climbing system and the right climbing system are configured to be mounted on the clamping yoke when the clamping system is clamped onto the rotor blade, and a position at least in the longitudinal direction of the rotor blade of the first roller of at least one of the left climbing system and the right climbing system is adjustable by means of an actuator.

2. The rotor blade hoisting system according to claim 1, wherein, when the clamping system is clamped onto the rotor blade, a position of the first roller of each of the left climbing system and the right climbing system is individually adjustable by means of an actuator at least in a specific direction extending transversely to the longitudinal direction of the rotor blade, and wherein said specific direction extends at least substantially in the direction of a chord of the rotor blade.

3. The rotor blade hoisting system according to claim 2, wherein, when the clamping system is clamped onto the rotor blade, a direct distance between the first rollers of the left climbing system and the right climbing system, respectively, is variable within certain limits.

4. The rotor blade hoisting system according to claim 2, wherein, when the clamping system is clamped onto the rotor blade, a direct distance between the first rollers of the left climbing system and the right climbing system, respectively, is individually adjustable by means of at least one actuator.

5. The rotor blade hoisting system according to claim 2, wherein the first roller of at least one of the left climbing system and the right climbing system is arranged on a swing arm being arranged on the clamping system, and wherein a swing arm actuator is arranged to swing said swing arm in relation to the clamping system.

6. The rotor blade hoisting system according to claim 1, wherein, when the clamping system is clamped onto the rotor blade, a direct distance between the first rollers of the left climbing system and the right climbing system, respectively, is variable within certain limits.

7. The rotor blade hoisting system according to claim 6, wherein the first roller of at least one of the left climbing system and the right climbing system is arranged on a swing arm being arranged on the clamping system, and wherein a swing arm actuator is arranged to swing said swing arm in relation to the clamping system.

8. The rotor blade hoisting system according to claim 1, wherein, when the clamping system is clamped onto the rotor blade, a direct distance between the first roller of the left climbing system and the first roller of the right climbing system is individually adjustable by means of at least one actuator.

9. The rotor blade hoisting system according to claim 8, wherein the first roller of at least one of the left climbing system and the right climbing system is arranged on a swing arm being arranged on the clamping system, and wherein a swing arm actuator is arranged to swing said swing arm in relation to the clamping system.

10. The rotor blade hoisting system according to claim 1, wherein the first roller of at least one of the left climbing system and the right climbing system is arranged on a swing arm being arranged on the clamping system, and wherein a swing arm actuator is arranged to swing said swing arm in relation to the clamping system.

11. The rotor blade hoisting system according to claim 10, wherein the swing arm is arranged pivotally on the clamping system generally about a main pivot axis extending transversely in relation to the rotor blade, when the clamping system is clamped onto the rotor blade, and wherein the swing arm actuator is arranged to pivot said swing arm generally about said main pivot axis.

12. The rotor blade hoisting system according to claim 11, wherein said swing arm is composed by a first section and a second section being pivotally linked together about an auxiliary pivot axis extending transversely to the main pivot axis.

13. The rotor blade hoisting system according to claim 12, wherein an auxiliary swing arm actuator is arranged to pivot the first section and the second section in relation to each other.

14. The rotor blade hoisting system according to claim 11, wherein said swing arm is composed by a first section and a second section being pivotally linked.

15. The rotor blade hoisting system according to claim 10, wherein said swing arm is composed by a first section and a second section being pivotally linked.

16. The rotor blade hoisting system according to claim 15, wherein an auxiliary swing arm actuator is arranged to pivot the first section and the second section in relation to each other.

17. A method of installation and/or deinstallation of a rotor blade on a hub of a wind turbine, the method including the following steps:
mounting an upper cable support system on a top end of the wind turbine,
arranging a lower cable support system at a lower end of the wind turbine at a distance from the wind turbine, extending, in spaced relationship, at least a left cable and a right cable from the lower cable support system to the upper cable support system,
clamping a clamping system, including a left climbing system and a right climbing system, onto the rotor blade,
arranging the left climbing system of the clamping system on the left cable and the right climbing system of the clamping system on the right cable, each of the left climbing system and the right climbing system including at least a first roller and a second roller, respectively, rolling on the respective cable and being spaced in a longitudinal direction of the rotor blade, the first rollers of the left climbing system and the right climbing system being placed nearer a root end of the rotor blade than the second rollers of the left climbing system and the right climbing system,
driving at least one of the first roller and the second roller of each of the left climbing system and the right climbing system by means of a motor, thereby hoisting the rotor blade upward or downward,
arranging a clamping yoke of the clamping system at a position of a centre of gravity of the rotor blade, at least in the longitudinal direction of the rotor blade, and mounting the left climbing system and the right climbing system on the clamping yoke, and
when the rotor blade is at a first intermediate hoisting position between the lower end of the wind turbine and the top end of the wind turbine, adjusting a position at least in the longitudinal direction of the rotor blade of the first roller of at least one of the left climbing system and the right climbing system by means of an actuator in such a way that the rotor blade yaws about a vertical axis extending in a transverse direction of relative to the longitudinal direction of the rotor blade and/or tilts about a horizontal axis extending in a transverse direction relative to the longitudinal direction of the rotor blade.

18. The method of installation and/or deinstallation of a rotor blade according to claim 17, whereby, when the rotor blade is at a second intermediate hoisting position being above the first intermediate hoisting position, a position at least in a specific direction extending transversely to the longitudinal direction of the rotor blade of the first roller of each of the left climbing system and the right climbing system is individually adjusted by means of an actuator in such a way that the rotor blade tilts about a horizontal axis extending in a transverse direction relative to the longitudinal direction of the rotor blade.

19. The method of installation and/or deinstallation of a rotor blade according to claim 18, whereby a relative position between the first roller of at least one of the left climbing system and the right climbing system and the clamping yoke is adjusted by adapting a position of a swing arm arranged on the clamping yoke and carrying said first roller of at least one of the left climbing system and the right climbing system.

20. The method of installation and/or deinstallation of a rotor blade according to claim 17, whereby a relative position between the first roller of at least one of the left climbing system and the right climbing system and the clamping yoke is adjusted by adapting a position of a swing arm arranged on the clamping yoke and carrying said first roller of at least one of the left climbing system and the right climbing system.

* * * * *